(12) United States Patent
Jordan

(10) Patent No.: US 6,700,963 B1
(45) Date of Patent: Mar. 2, 2004

(54) SYSTEM AND METHOD THEREFOR OF PREVENTING FRAUD ON PAY PHONE CREDIT/DEBIT CALLING CARD AUTHORIZATION

(75) Inventor: David P. Jordan, Alexandria, VA (US)

(73) Assignee: WorldCom, Inc., Clinton, MS (US)

(*) Notice: Subject to any disclaimer, the term of this patent is extended or adjusted under 35 U.S.C. 154(b) by 0 days.

(21) Appl. No.: 09/056,699

(22) Filed: Apr. 8, 1998

(51) Int. Cl.[7] ............................................. H04M 17/00
(52) U.S. Cl. ................................. 379/188; 379/144.03
(58) Field of Search ................................. 379/144, 145, 379/143, 188–200, 372, 373, 155, 144.03

(56) References Cited

U.S. PATENT DOCUMENTS

| | | | | |
|---|---|---|---|---|
| 3,899,640 A | * | 8/1975 | Piacente et al. | 379/200 |
| 4,002,848 A | * | 1/1977 | Stein | 379/194 |
| 4,063,036 A | * | 12/1977 | Hunsicker | 179/6.3 |
| 4,188,508 A | * | 2/1980 | Rogers et al. | 379/194 |
| 4,277,647 A | * | 7/1981 | Brolin et al. | 379/146 |
| 4,284,851 A | * | 8/1981 | Schweitzer et al. | 379/194 |
| 4,313,038 A | * | 1/1982 | Nilssen et al. | 379/188 |
| 4,314,103 A | * | 2/1982 | Wilson | 379/77 |
| 4,683,583 A | * | 7/1987 | Kossor | 379/200 |
| 4,794,642 A | | 12/1988 | Arbabzadah et al. | 379/144.03 |
| 4,896,348 A | | 1/1990 | Grantland et al. | 379/145 |
| 4,924,512 A | * | 5/1990 | Sizemore et al. | 379/200 |
| 4,975,943 A | * | 12/1990 | Weber et al. | 379/200 |
| 5,150,399 A | * | 9/1992 | Yasuda | 379/201 |
| 5,150,403 A | | 9/1992 | Jordan | 379/145 |
| 5,327,492 A | * | 7/1994 | Parola | 379/361 |
| 5,369,690 A | * | 11/1994 | Comfort | 379/372 |
| 5,392,348 A | * | 2/1995 | Park et al. | 379/386 |
| 5,425,085 A | | 6/1995 | Weinberger et al. | 379/114.02 |
| 5,596,632 A | * | 1/1997 | Curtis et al. | 379/138 |
| 5,694,461 A | * | 12/1997 | Lee | 396/196 |
| 5,724,404 A | * | 3/1998 | Garcia et al. | 379/34 |
| 5,745,555 A | * | 4/1998 | Mark | 379/95 |
| 5,757,896 A | | 5/1998 | Akhteruzzaman et al. | 379/145 |
| 5,818,931 A | * | 10/1998 | Movassaghi | 379/200 |
| 5,859,875 A | * | 1/1999 | Kato et al. | 375/267 |
| 6,052,453 A | * | 4/2000 | Sagady et al. | 379/146 |
| 6,072,863 A | | 6/2000 | Potter, Jr. | 379/143 |

OTHER PUBLICATIONS

Galler, "a bit more on the Airport Telephone scam from TelecomDigest" internet: http://www.monkey.org/geeks/archive/9807/msg00027.html.*

Bigelow, S., ed., "Understanding Telephone Electronics," Third Edition, pp. 65–68 & 107–110, 1997.

* cited by examiner

*Primary Examiner*—Fan Tsang
*Assistant Examiner*—Ovidio Escalante

(57) ABSTRACT

To prevent fraudsters from illicitly collecting the authorization number or authorization code, as well as personal identification number, of an unsuspecting authorized user of a public pay phone, the instant invention disables the keypad of the telephone so long as the pay phone is connected to an incoming call, unbeknownst to the authorized user who is attempting to dial out from that pay phone, and the user is detected to have lifted the handset of the pay phone to attempt to dial out. An alternative method of ensuring that the authorization code of an unsuspecting user is not misappropriated includes adding a circuit to the circuitry of the telephone to ensure that a true dial tone is provided when the user picks up the handset. If no true dial tone is detected, the keypad of the telephone remains disabled. The first and second embodiments may be combined to form yet another circuit that could be added to a conventional pay phone circuitry to prevent pay phone credit/debit calling card authorization code fraud.

44 Claims, 4 Drawing Sheets

SYSTEM AND METHOD THEREFOR OF PREVENTING FRAUD ON PAY PHONE CREDIT/DEBIT CALLING CARD AUTHORIZATION

FIELD OF THE INVENTION

The present invention relates to the prevention of fraud and more particularly to the prevention of fraudulent misappropriation of credit/debit card authorization numbers and passwords when public pay phones are used.

BACKGROUND OF THE INVENTION

A fraud scheme that has recently come to the attention of telecommunication service providers involves pay phones located in public areas such as airports, train stations and the like. Due to the nature of those public areas and the great number of installed public phones, most of the pay phones typically have their ringers disabled by the management of those public places. This is to eliminate the often-annoying rings to those phones, which are made, in most instances, by people who have dialed the wrong numbers. Thus, if an unsuspecting person were to pick up one of these pay phones while a call is incoming, he would end up being connected to whoever made the call.

Calling card fraudsters have seized upon these non-ringing pay phones as an opportunity to defraud unsuspecting authorized pay phone users. In particular, what the fraudsters have done is to call pay phones located in public areas, and wait for an unsuspecting authorized pay phone user to pick up the phone to make an outgoing call. There are two ways in which the fraudsters try to trick a user into providing his authorization code and/or pin number via the keypad of the telephone. The first method is where a bogus dial tone and a bong tone are generated from the fraudster's phone after the pay phone user picks up the handset of the phone. Upon hearing the dial tone and bong tone, the unsuspecting user would dial his 800 access number, calling card number and pin number, and await connection. The connection, of course, never occurs. After a while, the caller simply hangs up, thinking that he must have misdialed, and tries again. The fraudster, in the meantime, has acquired the caller's authorization code and pin number by receiving the tone associated with the caller's pressing of the keys of the keypad of the telephone. This generating of a dial tone and bong tone is usually done by means of a tape playback.

A second method whereby an unsuspecting authorized pay phone user is defrauded is when the fraudster uses two lines so that when the authorized user makes a call, he is conferenced by the fraudster via the second line to his destination. In the meantime, the fraudster has captured the authorization number or code of the pay phone user. Once the authorization number has been captured, the fraudster either can let the call be completed or simply hangs up on the authorized user.

There is therefore, a need for a system, and method therefor, of preventing this kind of pay phone credit/debit calling card fraud.

SUMMARY OF INVENTION

To prevent the type of credit/calling card abuse outlined above; a pay phone of the present invention is provisioned with a circuitry that disables the keypad under certain circumstances. In one embodiment, a sensor circuit is provided for monitoring incoming, or in-bound, calls (from the fraudsters) that are answered by authorized caller, such as for example an airport patron. Thus, with the keypad being disabled, when attempting to dial out, the authorized caller will not hear any tones associated with his pressing of the keys of the keypad. Consequently, the caller would, like most people, naturally flash-hook the phone, thereby disconnecting the incoming call from the fraudster. A clear line of course is then obtained.

To practice the first embodiment, a circuit to be added to the pay phone circuitry monitors any incoming call signals, by way of the incoming ring current. A second circuit is then used to monitor whether the handset of the pay phone has been lifted off-hook. Upon satisfaction of both of those conditions, yet a third circuit will disable the DTMF. (dual tone multi-frequency) encoder of the telephone, so that when pressed, the keys on the keypad would not generate any associated output tones. Attentively, an open circuit may be created to prevent power from being supplied to the keypad if one contact side of the keypad is ordinarily energized.

A second embodiment of the instant invention is to provide a circuit for discriminating the various dial tones to detect a true dial tone, which is 350–440 Hz, provided by the local telephone company or a PBX switch. With the detection of a true dial tone when the handset is lifted off-hook, a clear line is ensured.

Yet a third embodiment of the instant invention provides circuits for monitoring the ring current from incoming calls, whether the handset of the telephone has been lifted off hook, and whether there is a true dial tone. It is only when all three conditions are met that the keypad of the telephone is enabled so that tones associated with the keys pressed by the user on the keypad are generated.

Given that the circuits that are required can be easily added to the conventional telephone circuitry and do not cost a great amount, the present invention is able to prevent the type of fraud practiced by fraudsters mentioned above economically.

BRIEF DESCRIPTION OF THE DRAWINGS

The above-mentioned objectives and advantages of the present invention will become more apparent and the invention itself will be best understood by reference to the following description of the present invention taken in conjunction with the accompanying drawings, wherein.

DETAILED DESCRIPTION OF THE PRESENT INVENTION

Figure 1:
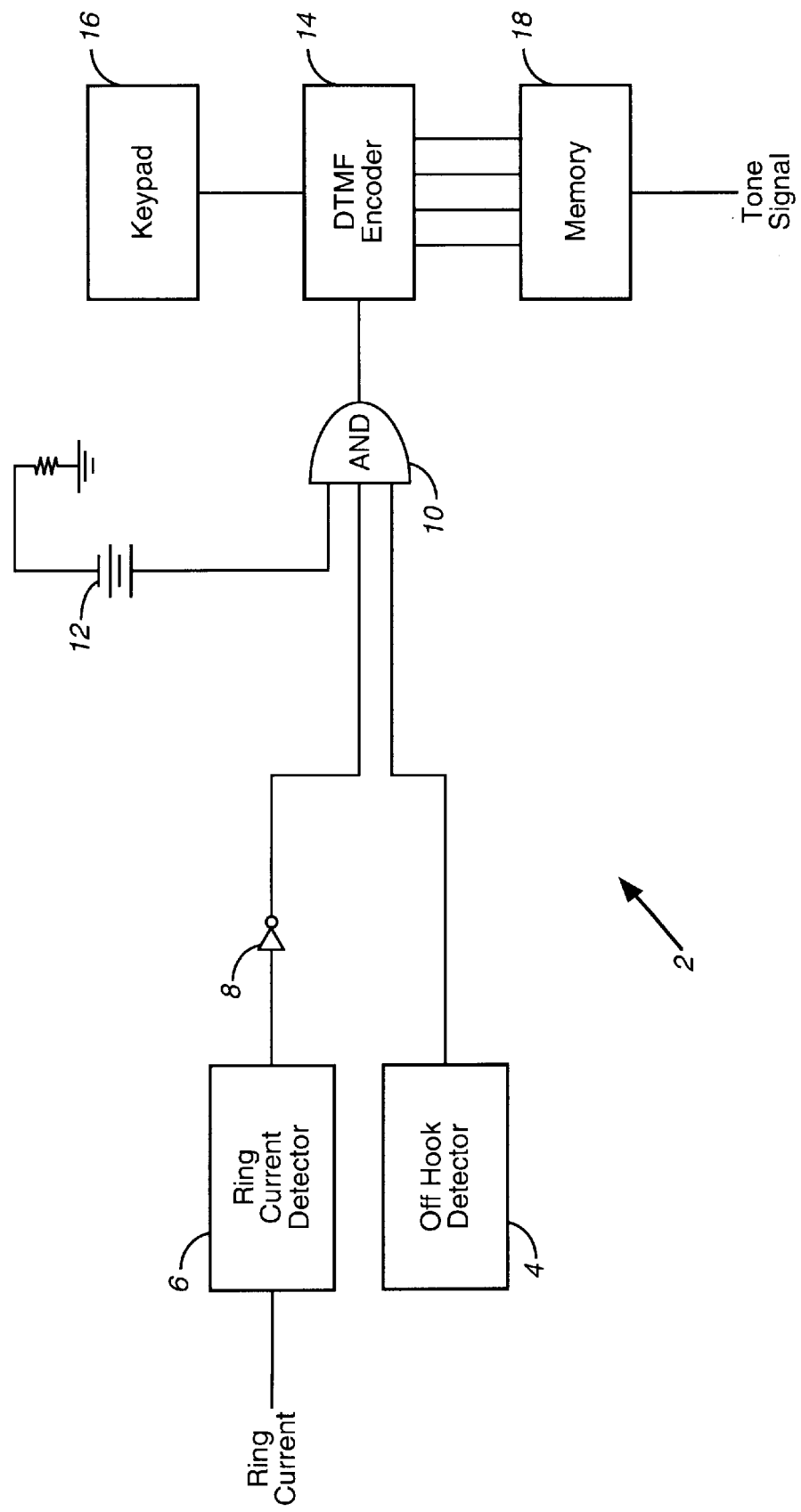
FIG. 1 is a circuit illustrating the first embodiment of the instant invention.
Figure 3:
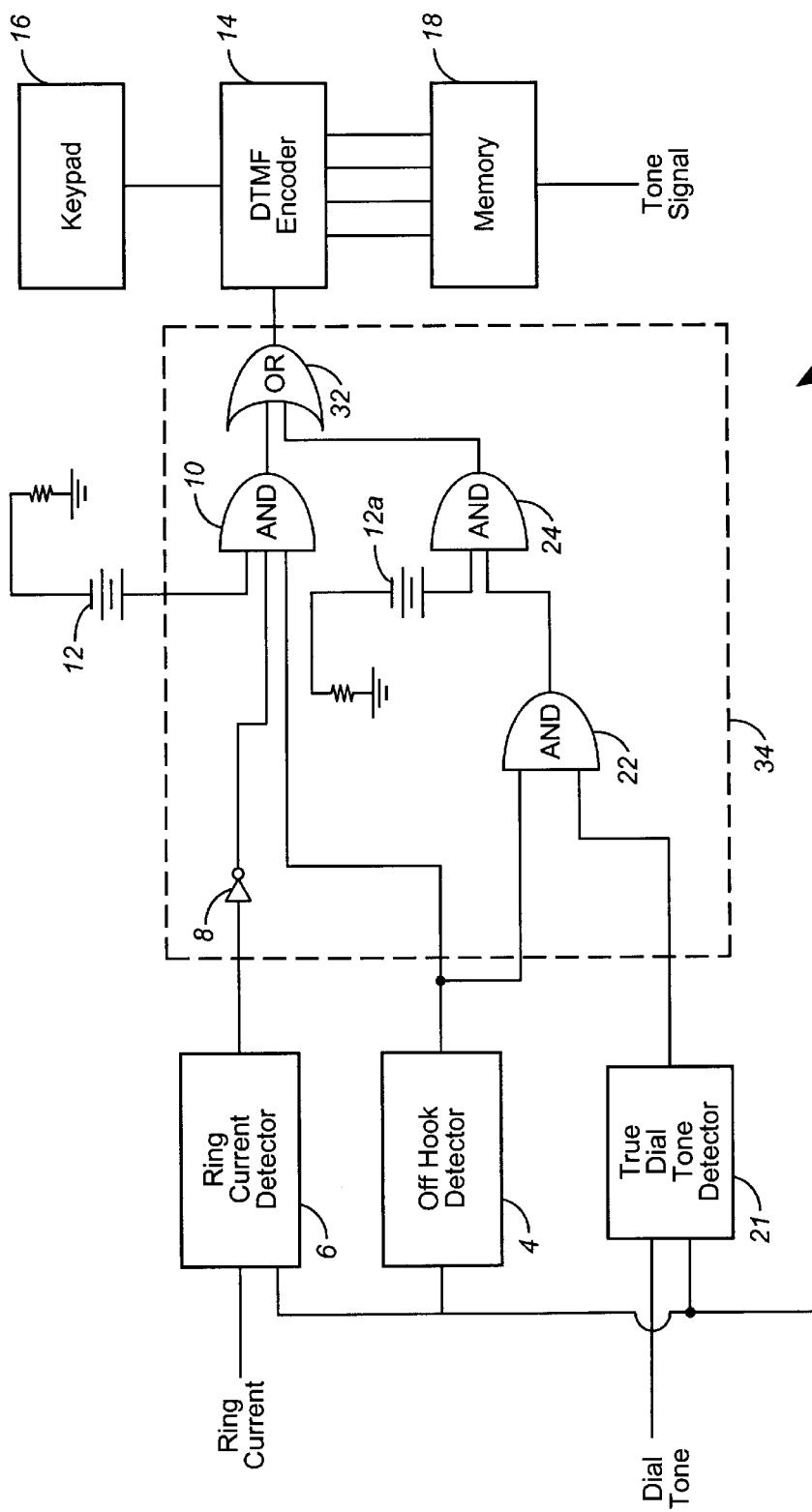
FIG. 3 is a circuit added to a conventional telephone circuitry that illustrates a third embodiment of the instant invention.

Not to be limiting, FIGS. 1 and 3 show different embodiments of circuits that could be added to the circuitry of a conventional telephone for preventing pay phone credit/debit calling card fraud.

In particular, the type of fraud, as discussed above, focuses on an unsuspecting authorized user who picks up a non-ringing telephone at a public place such as for example an airport and attempts to dial out. Unbeknownst to him, a fraudster, knowing the telephone number of the ringless telephone, had in fact been calling that telephone and waiting for the unsuspecting authorized user to use that pay phone. Using conventional equipment, the fraudster can determine when the handset is lifted off-hook so that the appropriate fraudulent dial tone and bong tones are generated. Believing that the bogus dial tune is genuine, the user would enter his authorization number, by means of the keys of the keypad of the telephone. The various tones generated are then recorded by the fraudster, to be played back later for retrieving the caller's authorization code. Not getting through, the caller eventually will hang-up, thinking that he either has dialed the wrong number or that the pay phone is not operational.

A variant of this scam involves the use of two lines by the fraudster for conferencing the caller to his destination. Again, both dial and bong tones are used for enticing the unsuspecting user to input his authorization code, which is then collected, memorialized, and distributed by the fraudster.

The instant invention prevents the above types of fraudulent schemes by adding circuitry that makes inoperative the keypad of the pay phone. As shown in FIG. 1, a first embodiment of the instant invention circuit 2 to be added to the conventional circuitry of a pay phone includes a ring current detector 6, which is a conventional detector that discriminates a given level of current calculated to be representative of an incoming call. A second component of FIG. 1 circuit is an off-hook detector 4, which can be any kind of sensor that detects the handset as having been lifted off-hook. This sensor can be incorporated as part of the "cradle" of a conventional telephone. Ring current detector 6 in turn is connected, by way of a NOT gate 8, to an AND gate 10. Another input of AND gate 10 is the output from off-hook detector 4. Power is supplied to AND gate 10 by power supply 12. The output of AND gate 10 is output to a DTMF encoder 14, which has as another input the output from keypad 16 of the telephone. DTMF encoder 14 has its outputs connected to a memory 18, which, in receipt of an encoded signal from DTMF encoder 14, outputs an appropriate tone signal.

The operation of DTMF encoder 14 in conjunction with keypad 16 and memory 18 is well known. Briefly, when a key is pressed by a user on keypad 16, a particular signal is generated and fed to DTMF encoder 14. There, the signal is encoded into a given tone, represented for example by 4 bits which are fed as outputs to memory 18. Memory 18 then converts the input encoded data into the appropriate tone signal that is associated with particular key pressed by the user at keypad 16.

Circuit 2 of FIG. 1 operates as follows. When no off-hook signal is received or detected by off-hook detector 4, a negative output is provided thereby to AND gate 10. Having now received the negative signal, AND gate 10 will prevent any power from being provided to DTMF encoder 14. As a consequence, no matter whichever key the user presses on keypad 16, any signal output from keypad 16 to DTMF encoder 14 will not cause any tone to be generated. Of course, it should be appreciated that, instead of being provided to DTMF encoder 14, the output of AND gate 10 may be connected to keypad 16 for providing energization thereof, provided that keypad 16 could be energized.

When an incoming call is detected by ring current detector 6, a positive output is provided to a NOT gate, which provides a negative, output to AND gate 10. Again, having now received a negative signal, AND gate 10 will prevent any power from being provided to DTMF encoder 14. At this time DTMF encoder 14 is prevented from being energized. Therefore, whether or not any keys have yet been prosed by a user, no signal is being output thereby. In any event, it is conventional that so long as the handset of the telephone remains cradled to the telephone, no tones are provided by the pressing of any keys on the keypad 16. So whether or not DTMF encoder 14 is energized at that point is a moot issue, as far as the instant invention is concerned.

When the handset is lifted off-hook by the user, it is detected by off-hook detector 4. Off-hook detector 4 then generates a positive signal, which gets fed to AND gate 10. When no incoming call is received, a negative signal is output from ring current detector 6. This negative signal is converted by NOT gate 8 into a positive input to AND gate 10. Having now received positive signals from both off-hook detector 4 and NOT gate 8 enables DTMF encoder 14 to be energized.

Figure 2:
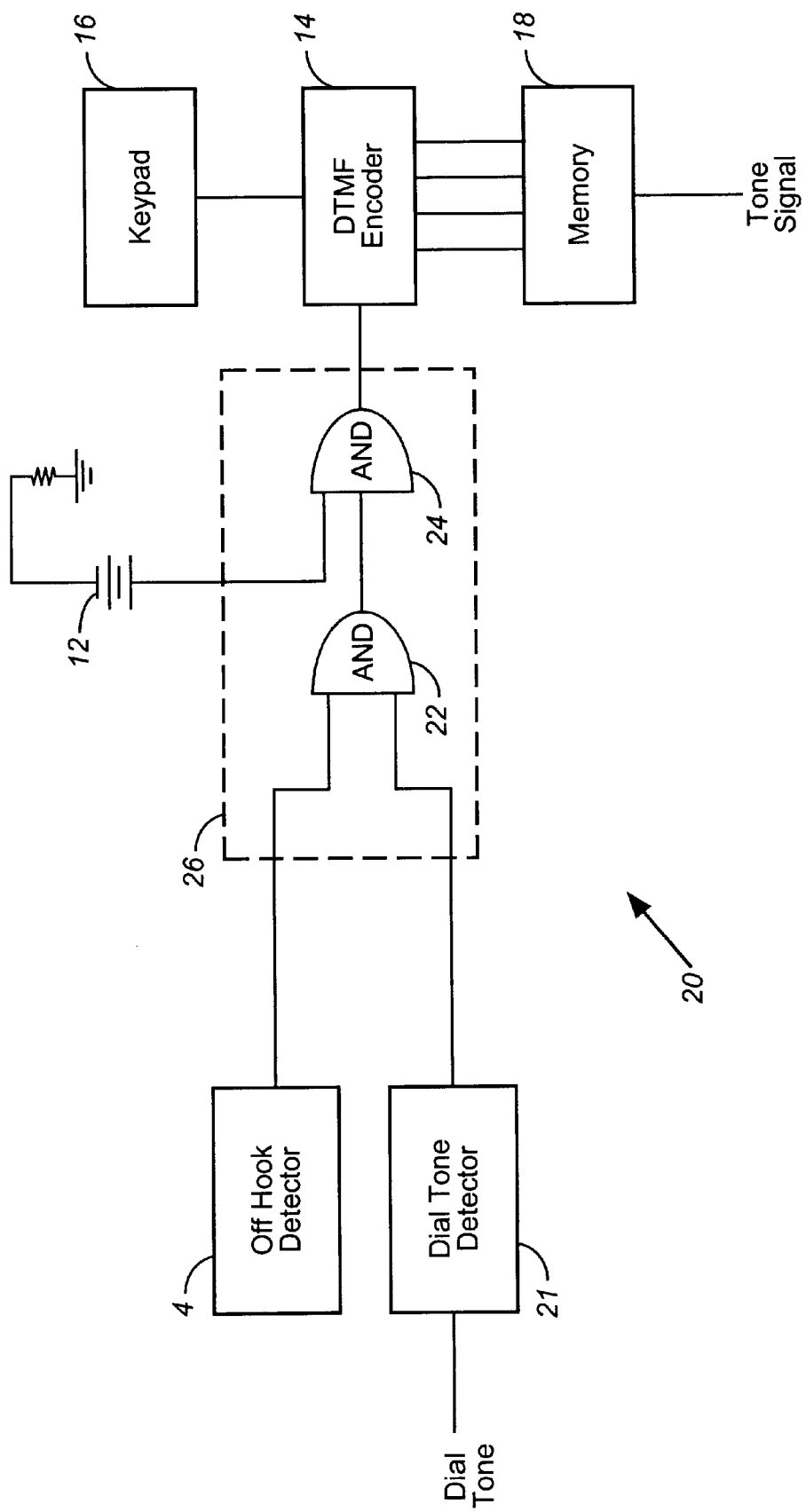
FIG. 2 is an add on circuit illustrating a second embodiment of the instant invention.

A second embodiment of the instant invention is illustrated in FIG. 2. The components in FIG. 2, as well as FIG. 3, which are the same as those shown in FIG. 1, arc numbered the same. The FIG. 2 circuit 20 has as one of its components the off-hook detector 4 discussed previously. Circuit 20 moreover has a true dial tone detector 21, which discriminates from inputs thereto whether a signal is a true dial tone. The outputs of both off-hook detector 4 and dial tone detector 21 are provided as an input to a second AND gate 22, which output is provided as an input to a second AND gate 24. A second input of AND gate is from power 12. The output of AND gate 24 is provided as an input to DTMF encoder 14. For the discussion of FIG. 2, AND gates 22 and 24 may be considered as a separate circuit, enclosed by dotted box 26.

Circuit 20 of FIG. 2 operates as follows, Assume that a pay phone is a public area that has its ring mechanism silenced is receiving an incoming call from a fraudster. Not suspecting, an authorized user picks up the phone in an attempt to make an outbound call from that pay phone. At that time, off-hook detector 4 senses that that phone has been lifted off-hook. A positive signal is then provided thereby to AND gate 22. Yet so long as the fraudster continues to be connected to the pay phone, true dial tone detector 21 would continue to generate a negative signal to AND gate 22. As a consequence, a negative output is provided by AND gate 22 to AND gate 24, so that no power is provided to DTMF encoder 14. As a result, no tone signals are generated by the user pressing the keys of keypad 16, as keypad 16 remains inoperative.

Not hearing any tone signals, the user naturally would attempt to hang-up and try again, i.e. flash-hook the handset. By thus flash-hooking the cradle of the handset of the telephone, the user would unknowingly disconnect the incoming call from the fraudster. Now having a clear line, the switch provides a true dial tone to dial tone detector 21. In receipt of the true dial tone, dial tone detector 21 generates a positive signal to AND gate 22, which, now having two positive signals from both off-hook detector 4 and dial tone detector 21, generates a positive output to AND gate 24. As a consequence, DTMF encoder 14 is energized by power 12, thereby resulting in keypad 16 being once more becoming operational.

The third embodiment of the instant invention is illustrated in FIG. 3. Circuit 30 of the third embodiment of the instant invention combines both circuits of FIGS. 1 and 2 to provide redundancy. To begin, circuit 30 incorporates off-hook detector 4, ring current detector 6 and true dial tone detector 21. The output of ring current detector 6 is provided to NOT gate 8. Likewise, the outputs from NOT gate 8 and off-hook detector 4 are provided as inputs to AND gate 10, which has as an additional input power 12. The output from off-hook detector 6 is also provided as an input to AND gate 22, which has as its other input the output from true dial tone detector 21. Like the circuit shown in FIG. 2, the output of AND gate 22 is provided as an input to AND gate 24, which has as its other input power 12a.

For circuit 30 of FIG. 3, the output of AND gate 10 and the output from AND gate 24 are provided as an inputs to an OR gate 32, which has its output provided as an input to DTMF encoder 14. Thus, so long as either circuit, i.e., the combination of ring current detector 6/NOT gate 8 and off-hook detector 4, or the combination of off-hook detector 4 and dial tone detector 21, is operating properly, DTMF encoder 14 would remain deenergized when there is an incoming call or when there is no true dial tone detected. Thus, DTMF encoder 14 (or keypad 16) is energized only when ring current detector 6 no longer detects an incoming call (or ring current) and when off-hook detector 4 has detected that the handset has been lifted off-hook, or when the true dial tone detector 21 has detected a true dial tone and when off-hook detector 4 has detected that the handset has been lifted off-hook. The various gates of circuit 30, which could be considered as a circuit by itself, are shown to be enclosed by the dotted box 34.

Another aspect of the instant invention is the recognition by the inventor that fraud can only be practiced by a fraudster on credit/debit card calls in other words, the telephone service providers do not care if a user were to make a coin operated call, which does not require any authorization code. For example, if a user were to make a coin operated call, chances are he will put into the pay phone a given number of coins and then dial the destination telephone number. In that case, since no authorization number is requested, a fraudster could not obtain anything worth his while from that user. Therefore, there is no need to disable the keypad for such a user. Hence, DTMF encoder 14 (or keypad 16) should be enabled for such coin operated user.

Such is achieved by the addition to the FIG. 3 circuit 30 a credit or phone card discrimination 36, which can determine whether a user is making a credit card call or a coin call. If it is a coin operated call, there is no need to making keypad 16 inoperative. But if discriminator 36 does determine that the user is about to make a credit card call, then the same operations performed by the various detectors of the FIG. 3 circuit 30 will remain the same as before. In other words, for the FIG. 3 circuit, no tone signals are generated by a user pressing the keys of keypad 16 so long as there is an incoming call being detected by ring current detector 6, that the handset is detected to have been lifted off-hook, or that no true dial tone has been detected by true dial tone detector 21.

The same can be said with respect to the circuits of FIGS. 1 and 2, in the event that the credit or phone card discriminator 36 is added to each of those circuits. Thus, so long as the call being placed by the user remains a credit card cal, no tone signals are generated as a result of the user pressing the keys of keypad 16.

Figure 4:
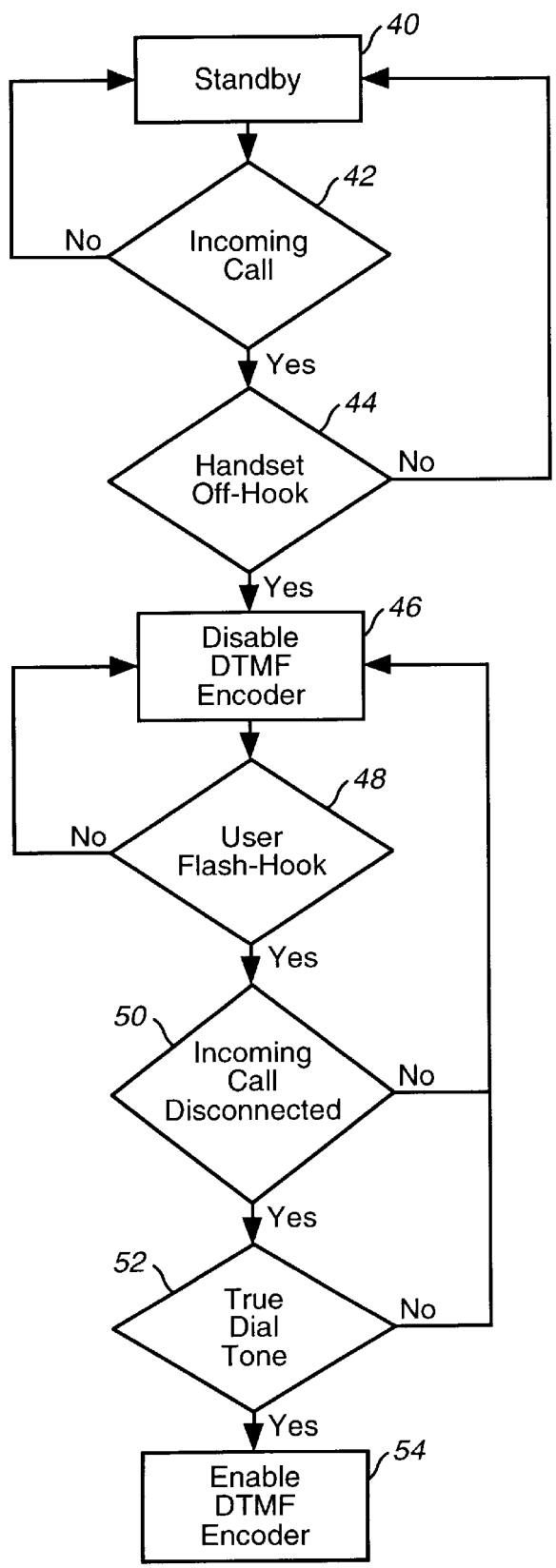
FIG. 4 is a flow diagram illustrating the various steps to be taken by the embodiment show in FIG. 3.

FIG. 4 is a flow diagram illustrating the operation of the FIG. 3 circuit. As shown, the process begins with the standby step 40. A determination is then made on whether there is an incoming call at step 42. If there is not, the process returns to standby at step 40. If there indeed is an incoming call, a determination is made on whether the handset is off-hook, per step 44. If the handset remains on-hook, tie process returns to step 40 to wait for an incoming call. If, on the other hand, the handset is detected to be off-hook in step 44, the process proceeds to step 46 to disable the DTMF encoder, or the keypad.

Thereafter, depending on whether the user has flash-hooked the cradle of the handset, per step 48, a determination is made on whether to continue to disable the DTMF encoder or to proceed with the process. If the user indeed had flash-hooked, the process proceeds to step 50, and a determination is made on whether the incoming call has been disconnected. If the incoming call has not been disconnected, the process returns to step 46, to thereby maintain the DTMF decoder in an inoperative state. However, if it is determined per step 50 that the incoming call has been disconnected by the user flash hooking, the process proceeds to step 52 to determine whether a true dial tone is detected. If no true dial tone is detected, the DTMF encoder remains disabled, as the process returns to step 46. If there is detected a true dial tone, the process proceeds to step 54 to enable the DTMF encoder. Thereafter, once the conversation is finished by the user, the process returns to standby, per step 40.

Inasmuch as the present invention is subject to many variations, modifications, and changes in detail, it is intended that all matters described in this specification and shown in the accompanying drawings be interpreted as illustrative only and not in a limiting sense. Accordingly, it is intended that the invention be limited only by the spirit and scope of the hereto appended claims.

What is claimed is:

1. A telephone having a handset and means for inputting data, comprising:
   a first circuit for detecting incoming calls;
   a second circuit for detecting the pickup of said handset;
   circuit means responsive to outputs from said first and second circuits for disabling the functioning of a keypad so that no data can be input via said keypad when an incoming call is detected and when said handset is detected as having been lifted off-hook, said keypad remaining disabled until no incoming call is detected, a central office dial tone is detected and said handset is detected as having been lifted off-hook.

2. The telephone of claim 1 wherein said means for inputting comprises the keypad; and
   wherein said circuit means prevents tones form being generated when a user presses the keys of said keypad when an incoming call is detected and when said handset is detected as having been lifted off-hook.

3. The telephone of claim 1, wherein said first circuit detects a ring current of the incoming calls, said telephone further comprising a ring mechanism that is inoperative on receipt of the ring current.

4. The telephone of claim 1, wherein said telephone is a pay phone, further comprising:
   third circuit to detect whether a call being made by a user at said telephone is a credit card call;
   wherein, if the call is a credit card call, said third circuit effects said first and said second circuits and said third circuit to cooperatively operate to prevent data input by said user from being output.

5. A telephone having a handset and means for inputting data comprising:
   a first circuit for distinguishing a central office dial tone from a non-central office dial tone;

a second circuit for monitoring the pick up of said handset;

circuit means responsive to outputs from said first and second circuits for enabling the functioning of a keypad so that data can be input via said keypad when said handset is detected as having been lifted off-hook and a central office dial tone is detected, and disabling the functioning of the keypad when said handset is detected as having been lifted off-hook and a central office dial tone is not detected.

6. The telephone of claim 5, wherein said means for inputting data comprises the keypad; and wherein said circuit means allows tones to be generated when a user presses a key of said keypad when said handset is detected as having been lifted off-hook and a central office dial tone is detected.

7. The telephone of claim 5, further comprising a ring mechanism that is inoperative on receipt of a ring current from an incoming call.

8. The telephone of claim 5, wherein said telephone is a pay phone, further comprising:

third circuit to detect whether a call being made by a user at said telephone is a credit card call;

wherein, if the call is a credit card call, said third circuit effects said first and said second circuits and said circuit means to cooperatively operate to enable said user to input data via said data inputting means when said handset is detected as having been lifted off-hook and a central office dial tone is detected.

9. A telephone having a handset and a data input encoder comprising:

a first circuit for monitoring incoming calls;

a second circuit for monitoring the pick up of said handset;

third circuit for distinguishing a central office dial tone from a non-central office dial tone;

a fourth circuit for enabling data to be input from a keypad only when no incoming call is detected by said first circuit, said handset is detected by said second circuit to be off-hook, and a central office dial tone is detected by said third circuit.

10. The telephone of claim 9, wherein said means for inputting comprises the keypad; and wherein said fourth circuit prevents tones from being generated when a user presses the keys of said keypad when an incoming call is detected and when said handset is detected as having been lifted off-hook.

11. The telephone of claim 9, wherein said first circuit detects a ring current of the incoming calls, said telephone further comprising a ring mechanism that is inoperative on receipt of the ring current.

12. The telephone of claim 9, wherein said telephone is a pay phone, further comprising:

fifth circuit to detect whether a call being made by a user at said telephone is a credit card call;

wherein, if the call is a credit card call, said fifth circuit effects said first, second, third and fourth circuits to cooperatively operate to prevent data input by said user from being output to someone else and to enable said user to use said telephone if fraudulent conditions are deemed not to be present.

13. A method of preventing a user from inputting data from a keypad of a telephone, comprising the steps of:

a) monitoring for incoming calls;

b) monitoring whether the handset of said telephone is off-hook; and c) disabling the functioning of said keypad when an incoming call is detected and when the handset is detected to be off-hook so that no tone is generated when the keys of said keypad are pushed, said keypad remaining disabled until no incoming call is detected, a central office dial tone is detected and said handset is detected as having been lifted off-hook.

14. The method of claim 13, wherein said step c) further comprises the step of preventing tones from being generated when a user presses a key of said keypad, when an incoming call is detected, and when said handset is detected as having been lifted off-hook.

15. The method of claim 13, wherein said telephone has a ring mechanism that is inoperative on receipt of the ring current; and wherein said step a) detects the ring current of any incoming call irrespective that there are no rings generated by said ring mechanism.

16. The method of claim 13, wherein said telephone is a pay phone, further comprising the steps of:

monitoring whether a call being made by a user at said telephone is a credit card call; and if the call is a credit card call, effecting said steps a), b), and c) to cooperatively operate to prevent data input by said user via said keypad from being output to someone else.

17. A method of preventing copying of data input by a user using the keypad of a telephone, comprising the steps of:

a) monitoring whether the handset of said telephone is off-hook;

b) monitoring for central office and non-central office dial tones after said handset is detected to be off hook; and c) preventing a key of said keypad from generating any tone when pressed if a central office dial tone is not detected after said handset is detected to be off-hook, said keypad remaining disabled until no incoming call is detected, a central office dial tone is detected and said handset is detected as having been lifted off-hook.

18. The method of claim 17, further comprising the step of:

allowing tones to be generated by said keypad when a user presses the keys of said keypad when said handset is detected as having been lifted off-hook, and when a central office dial tone is detected.

19. The method of claim 17, further comprising the steps of:

detecting whether a call being made by a user at said telephone is a credit card call; and if the call is a credit card call, effecting said steps a), b) and c) to cooperatively operate to enable said user to input data via said keypad when said handset is detected as having been lifted off-hook and a central office dial tone is detected.

20. A method of preventing the collecting of information from a telephone when a user presses on a key of a keypad of said telephone, comprising the steps of:

a) monitoring for incoming calls;

b) monitoring whether said handset is off-hook;

c) distinguishing a central office dial tone from a non-central office dial tone;

d) enabling data to be input from said keypad only when no incoming call is detected, said handset is detected to be off-hook, and a central office dial tone is detected, and disabling the functioning of the keypad when said handset is detected as having been lifted off-hook and a central office dial tone is not detected.

21. The method of claim 20, further comprising the step of:
  preventing tones from being generated when a user presses the keys of said keypad when an incoming call is detected and when said handset is detected as having been lifted off-hook.

22. The method of claim 20, wherein said step a) detects the ring current of the incoming calls for activating a ring mechanism at said telephone, said ring mechanism being inoperative on receipt of the ring current.

23. The method of claim 20, wherein said telephone is a pay phone, further comprising the steps of:
  detecting whether a call being made by a user at said telephone is a credit card call; and
  if the call is a credit card call, effecting said steps a, b, c and d to cooperatively operate to prevent data input by said user via said keypad from being output to someone else and to enable said user to use said telephone if fraudulent conditions are deemed not to be present.

24. A telephone having a handset and a data input encoder, comprising:
  an incoming call detector that detects incoming calls;
  an off-hook detector that detects the pick up of said handset;
  a data disabling circuit, responsive to outputs from said incoming and off-hook circuits, that disables the functioning of a keypad, said keypad remaining disabled until no incoming call is detected, a central office dial tone is detected and said handset is detected as having been lifted off-hook.

25. The telephone of claim 24, wherein the data disabling circuit operates so that no data can be input via said keypad when an incoming call is detected and when said handset is detected as having been lifted off-hook.

26. The telephone of claim 25, wherein the incoming call detector, the off-hook detector and the data disabling circuit are operatively coupled to the telephone, and the data disabling circuit disables operative power so that no data can be input via said keypad.

27. The telephone of claim 25 wherein said data input encoder comprises the keypad; and
  wherein said data disabling circuit prevents tones form being generated when a user presses a key of said keypad when an incoming call is detected and when said handset is detected as having been lifted off-hook.

28. The telephone of claim 25 wherein said incoming call detector detects a ring current of the incoming calls, said telephone further comprising a ring mechanism that is inoperative on receipt of the ring current.

29. The telephone of claim 25, wherein said telephone is a pay phone further comprising:
  a credit card call detector that detects whether a call being made by a user at said telephone is initiated by inputting a credit card authorization into the credit card detector; and
  wherein, if the call is a credit card call, said credit card detector effects said incoming call and said off-hook circuits and data disabling circuit to cooperatively operate to prevent data input by said user from being output.

30. A telephone having a handset and a data input encoder, comprising:
  a dial tone detector that distinguishes central office dial tones from non-central office dial tones;
  a handset detector that monitors the pick up of said handset;
  a data enabling circuit responsive to outputs from said dial tone detector and handset circuits that enables the functioning of a keypad upon detecting a central office dial tone, and disabling the functioning of the keypad when said handset is detected as having been lifted off-hook and a central office dial tone is not detected.

31. The telephone of claim 30, wherein the data enabling circuit operates so that data can be input via said keypad when said handset is detected as having been lifted off-hook and a central office dial tone is detected.

32. The telephone of claim 31, wherein the incoming call detector, the off-hook detector and the data enabling circuit are operatively coupled to the telephone, and the data enabling circuit enables operative power so that data can be input via said keypad.

33. The telephone of claim 31, wherein said data input encoder comprises a keypad; and
  wherein said data enabling circuit allows tones to be generated when a user presses a key of said keypad when said handset is detected as having been lifted off-hook and a central office dial tone is detected.

34. The telephone of claim 31, further comprising a ring mechanism that is inoperative on receipt of a ring current from an incoming call.

35. The telephone of claim 31, wherein said telephone is a pay phone, further comprising:
  a credit card detector to detect whether a call being made by a user at said telephone is initiated by inputting a credit card authorization into the credit card detector;
  wherein if the call is a credit card call, said credit card detector effects said dial tone and handset circuits and said data enabling circuit to cooperatively operate to enable said user to input data via said handset is detected as having been lifted off-hook and a central office dial tone is detected.

36. A telephone having a handset and a data input encoder, comprising:
  an incoming call detector that monitors incoming calls;
  a handset detector that monitors the pick up of handset;
  a dial tone detector that identifies central office and non-central office dial tones;
  a data input enabling circuit that enables data to be input from a keypad only when at least no incoming call is detected by said incoming call detector, said handset is detected by said handset detector to be off-hook, and a central office dial tone is detected by said dial tone detector.

37. The telephone of claim 36, wherein the data input enabling circuit operates so that no data can be input via said keypad when an incoming call is detected and when said handset is detected as having been lifted off-hook.

38. The telephone of claim 37, wherein the incoming call detector, the handset detector, the dial tone detector and the data input enabling circuit are operatively coupled to the telephone, and the data enabling circuit enables operative power so that data can be input via said keypad.

39. The telephone of claim 37, wherein said data input encoder comprises the keypad; and
  wherein said data input enabling circuit prevents tones from being generated when a user presses a key of said keypad when an incoming call is detected and when said handset is detected as having been lifted off-hook.

40. The telephone of claim 37, wherein said incoming call detector detects a ring current of the incoming calls, and said telephone further comprises a ring mechanism that is inoperative on receipt of the ring current.

41. The telephone of claim 37, wherein said telephone is a pay phone, further comprising:
   a credit card detector to detect whether a call being made by a user at said telephone is initiated by inputting a credit card authorization into the credit card detector;
   wherein, if the call is a credit card call, said credit card detector effects said incoming call, said handset, said dial tone and said data enabling circuits to cooperatively operate to prevent data input by said user from being output to someone else and to enable said user to use said telephone if fraudulent conditions are deemed not to be present.

42. A telephone having a handset and a data input encoder, comprising:
   an incoming call detector that detects incoming calls;
   an off-hook detector that detects the pick up of said handset;
   a data disabling circuit, comprising and AND gate and a NOT gate, responsive to outputs from said incoming and off-hook circuits, that disables the functioning of a keypad, said keypad remaining disabled until no incoming call is detected, a central office dial tone is detected and said handset is detected as having been lifted off-hook.

43. The telephone of claim 42, wherein the incoming call detector, the off-hook detector and the data disabling circuit are operatively coupled to the telephone, and the data disabling circuit disables operative power so that no data can be input via said keypad.

44. The telephone of claim 43, wherein the data disabling circuit operates so that no data can be input via said keypad when an incoming call is detected and when said handset is detected as having been lifted off-hook.

* * * * *